April 14, 1964 D. T. AYERS, JR 3,128,676
VEHICLE BRAKE MECHANISM
Filed June 14, 1962 3 Sheets-Sheet 1

INVENTOR
DAVID T. AYERS JR.
BY *John F. Phillips*
ATTORNEY

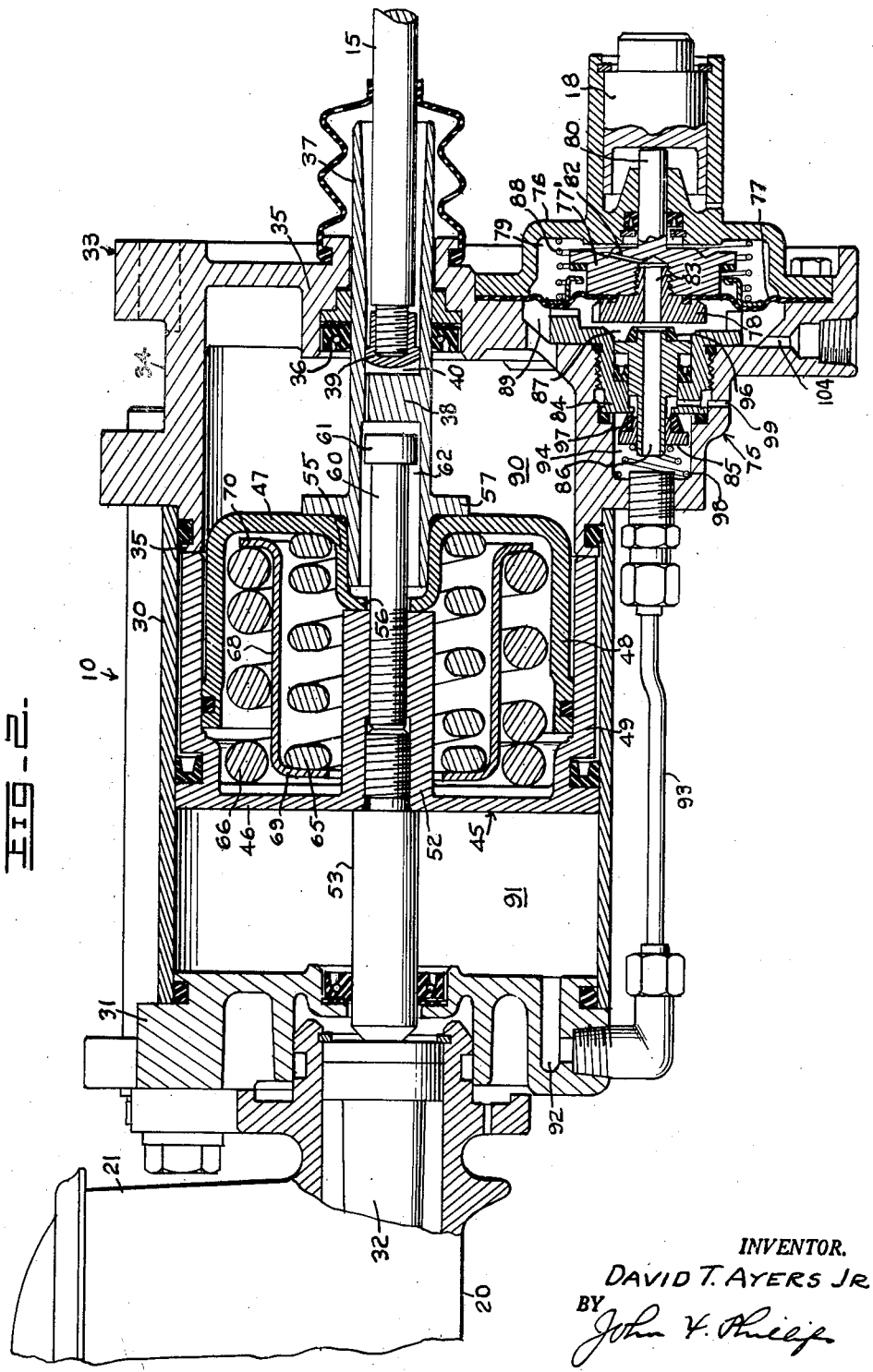

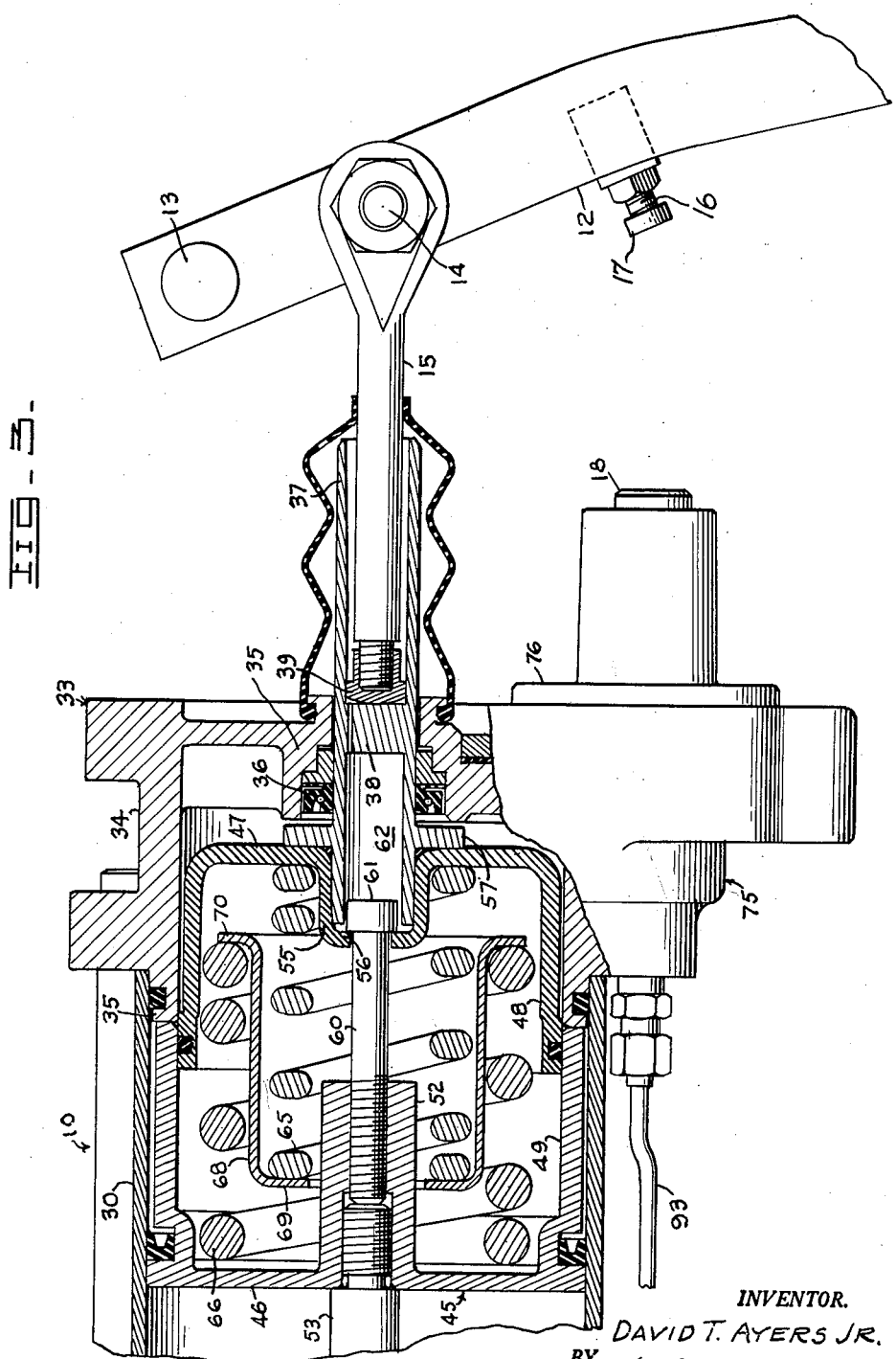

United States Patent Office 3,128,676
Patented Apr. 14, 1964

3,128,676
VEHICLE BRAKE MECHANISM
David T. Ayers, Jr., Birmingham, Mich., assignor to Kelsey-Hayes Company, Romulus, Mich., a corporation of Delaware
Filed June 14, 1962, Ser. No. 202,428
12 Claims. (Cl. 91—391)

This invention relates to a vehicle brake mechanism and has particular reference to a novel type of motor mechanism especially adapted for operating the hydraulic brakes of a motor vehicle.

In my copending application Serial No. 181,409, filed March 21, 1962, I have disclosed and claimed a motor mechanism for a similar purpose wherein the member to be operated, specifically a master cylinder plunger, is fully power operated as distinguished from a booster brake mechanism. Accordingly the brake pedal partakes of very limited movement for a full application of the brakes, such movement being required to operate only the valve mechanism for the motor. In the event of a failure in power in the source, a spring normally maintained compressed by pressure in the source, is freed to expand and moves the brake pedal to a second higher position, spaced from the motor valve mechanism for the manual operation of the brakes. When the brake pedal reaches such higher position, locking means establishes a positive mechanism connection between the brake pedal and master cylinder plunger and the mechanism establishes a lever ratio comparable to that in conventional brake systems to render manual braking much easier than is true of a booster brake mechanism when the source of power for the motor fails.

An important object of the present invention is to provide a motor mechanism of the general character referred to wherein, under normal conditions, the brake pedal partakes of very limited movement to operate the valve mechanism for the motor and in which means is provided, upon a failure in power in the source, for moving the brake pedal to a higher position for the manual operation of the brakes, such means being in the form of a spring or springs through which manual forces are adapted to be transmitted from the brake pedal to the master cylinder plunger without the provision of any mechanical locking means such as that provided in my copending application referred to.

A further object is to provide such a mechanism wherein the motor has a piston which, where superatmospheric pressure is employed, is normally pressure suspended to provide for very rapid response of the motor to movement of the brake pedal, and wherein the spring means employed for raising the brake pedal to its manually operable position is maintained compressed by pressure present in the motor.

A further object is to provide a novel type of motor piston embodying the spring means therein and wherein two or more springs may be employed for the purpose stated and arranged in concentric relation to shorten the overall length of the device, the sets of springs being maintained normally compressed by motor pressures and cooperating to transmit force from one to the other when the pedal is operated to manually apply the vehicle brakes.

Other objects and advantages of the invention will become apparent during the course of the following description.

In the drawings I have shown one embodiment of the invention. In this showing

FIGURE 2 is an axial sectional view through the motor mechanism and a portion of the master cylinder, the parts being shown in the normal positions from which they are movable for the power operation of the brakes, and FIGURE 3 is a similar view, parts being shown in elevation, when the motor piston parts are positioned for the manual operation of the brakes.

Figure 1:
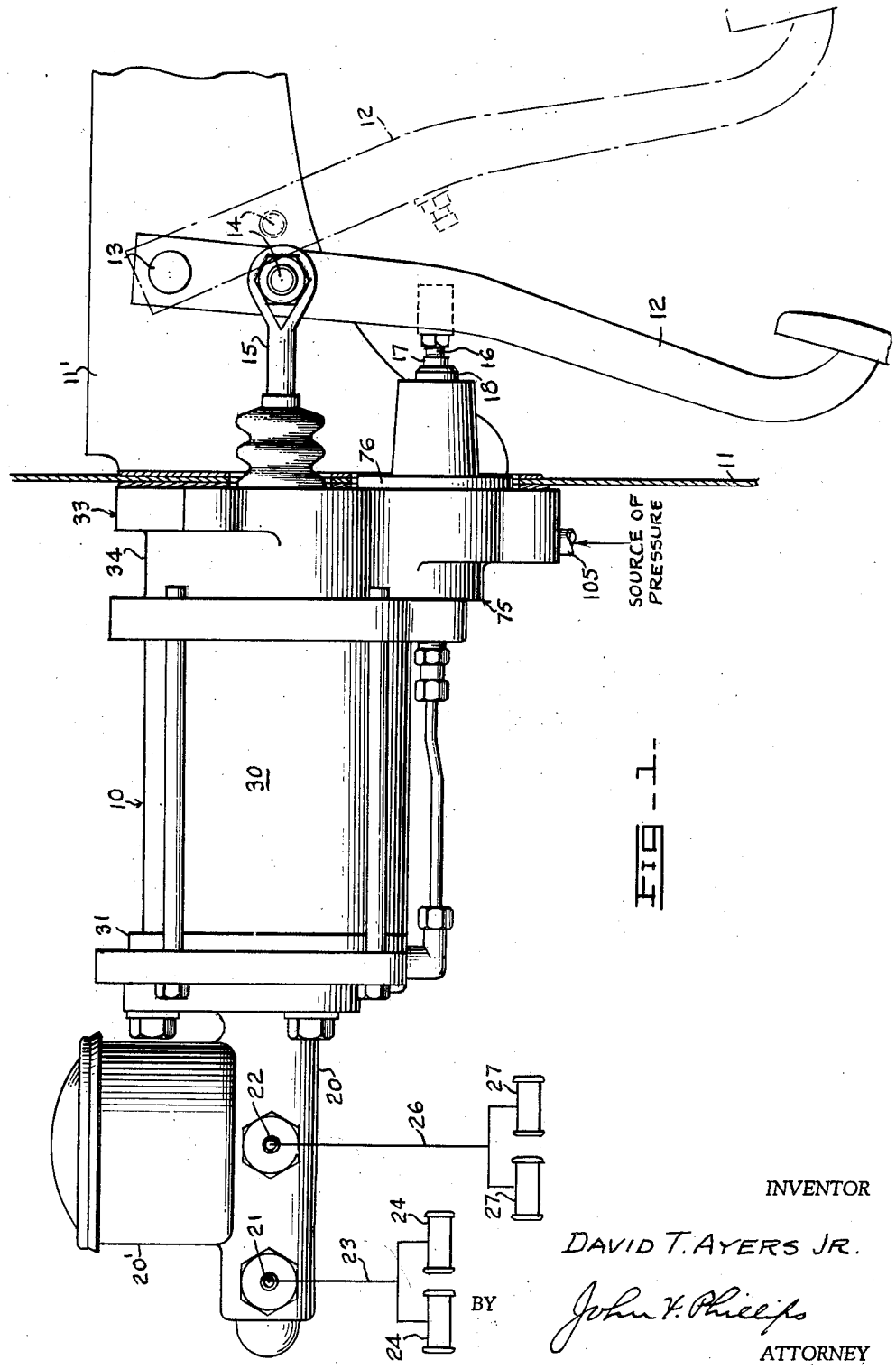
FIGURE 1 is a side elevation of the motor mechanism and master cylinder, the pedal being shown in solid lines in its normal position and in broken lines in the manually operable position, the connection of the master cylinder to the wheel cylinders being diagrammatically represented.

Referring to FIGURE 1 the numeral 10 designates a fluid pressure motor as a whole secured to the fire wall 11 of the vehicle by suitable bolts, not shown, which also serve to secure in position rearwardly of the fire wall a bracket 11'. A brake pedal 12 is pivoted to the bracket 11' as at 13 and is connected as at 14 to a push rod 15 and extending into the motor. This push rod performs no function so long as pressure is present in the source for the motor 10. The pedal 12 carries a screw 16 having a head 17 for operating the valve mechanism of the motor, to be described, by pushing to the left against a plunger 18. Upon a failure in power in the source, the pedal is automatically moved to the broken line position in FIGURE 1 for the manual operation of the brakes through the push rod 15.

A master cylinder 20, further referred to below, is provided with a conventional reservoir 20'. It is preferred that a dual plunger master cylinder (not shown) be employed having outlets 21 and 22, the former of which is piped as at 23 to the front wheel brake cylinders 24. The outlet 21 is piped as at 26 to the rear wheel brake cylinders 27.

The motor mechanism has been illustrated in detail in FIGURE 2. This mechanism comprises a cylinder 30 having a head 31 at one end to which the master cylinder 20 is connected, one of the master cylinder plungers being generally shown in FIGURE 2 and indicated with the numeral 32. The other end of the motor is provided with a head 33 provided with a forwardly extending cylindrical portion 34 terminating at its forward end in a shoulder 35 for a purpose to be described.

The head 33 has a central bearing portion 35 in which is arranged suitable bearing and sealing means 36 slidably supporting a sleeve 37 into which the forward end of the push rod 15 extends. The sleeve 37 is provided therein with an abutment 38 normally spaced from the head 39 carried by the forward end of the push rod 15. The space between the abutment 38 and the head 39 is indicated by the numeral 40. Such space forms a lost motion connection between the push rod 15 and sleeve 37 in which the pedal 12 is operable, as referred to below, for controlling the motor 10 through its valve mechanism.

Within the cylinder 10 is reciprocally mounted a pressure responsive unit or piston indicated as a whole by the numeral 45 and comprising forward and rear body members 46 and 47 the latter of which is provided with a cylindrical extension 48 slidable within and in sealing engagement with a cylindrical portion 49 of the member 46 which extends rearwardly as shown in FIGURE 2. The rear end of the cylindrical portion 49 normally seats against the shoulder 35 as shown in FIGURE 2 when the piston 45 is in normal position.

The body member 46 is provided with a rearwardly extending axially elongated hub portion 52 in the forward end of which is threaded the rear end of a push rod 53. This push rod has its forward end engaging the rear plunger of the master cylinder to impart movement thereto.

The body member 47 has a portion 55 extending forwardly in surrounding relationship with the forward end of the sleeve 37. At the forward end of the body portion 55, the material thereof turns radially inwardly as at 56 to form an abutment normally engaging the rear end of the hub 52. The body 47 engages a flange 57 formed on the sleeve 37.

An axial rod 60 is threaded in the rear end of the hub 52 and is provided at its rear end with a head 61. Such head is axially movable in the forward bore 62 of the sleeve 37 and is adapted to be engaged under conditions to be described with the flange 56.

Within the piston 45 is arranged relatively heavy concentric inner and outer springs 65 and 66. Between these springs is arranged a sleeve 68 the forward end of which turns inwardly as at 69 to form a seat for the forward end of the spring 65. The rear end of this spring seats against the radial wall of the body 47. The rear end of the sleeve 68 is turned radially outwardly as at 70. The spring 66 has its rear end engaging the flange 70 while the forward end of the spring 66 seats against the body 46. It will be apparent that the spring 66 transmits a force through the flange 70, sleeve 68 and flange 69, while the flange 69 exerts a force through the spring 65 whereby the rear end of such spring tends to move the body 47 rearwardly. Source pressure holds these springs compressed so long as pressure is present in the source, as described below.

The body 75 of the valve housing is preferably cast integral with the head 33 and is provided with a cap member 76 fixed thereto and clamping in position a diaphragm 77. The inner portion of the diaphragm is clamped between a body 77' and a screw head 78 and forms with the cap 76 a chamber 79. The body 77' is provided with an axial stem 30 and engages axially against the plunger 18. The body 77' is provided with a port 82 communicating with an axial bore 83 formed in the head 78.

A nut 84 is threaded in the valve housing 75 and slidably supports a two-part valve body 85 having an axial passage 86 therethrough. The right-hand end of this passage is open to a chamber 87 formed between the nut 84 and diaphragm 77.

It will become apparent that pressure from the source is normally present in the chambers 79 and 87 thus balancing pressures on opposite sides of the diaphragm 77. This diaphragm is biased to the left to its limit of movement by a spring 88, the diaphragm being limited in its movement to the left by adjacent portions of the nut 84. The nut 84 is cut away to afford communication between the chamber 87 and the porting 89 leading into the adjacent motor chamber 90. The other motor chamber 91 communicates through ports 92 and piping 93 with a chamber 94 formed within the valve housing 75 to the left of the valve body 85.

The valve body carries a pair of valves 96 and 97 the latter of which is normally held in closed position by a spring 98. When the valve 97 is closed, the valve 96 is unseated. When the head 78 moves into engagement with the valve 96, the valve passage 86 will be closed to the chamber 87, and the chamber 94, with the valve 97 open is vented to the atmosphere as at 99. Under normal conditions, source pressure is always present in the chamber 87, being supplied thereto by a port 104 connected by a line 105 (FIGURE 1) with a suitable source of pressure such as a compressor or storage tank on the vehicle.

*Operation*

The parts normally occupy the positions shown in FIGURE 2, while the brake pedal 12 normally is in the solid line position shown in FIGURE 1 with the head 17 engaging the end of the plunger 18. Pressure will be present in both motor chambers 90 and 91 since source pressure, supplied to the chamber 87, is communicated to the motor chamber 90 through ports 89, and is communicated to the motor chamber 91 through the valve passage 86 and pipe 93. This pressure in the motor chambers 90 and 91 acts oppositely against the heads 47 and 46 respectively to maintain the springs 65 and 66 compressed. The head 46 delivers pressure force to the adjacent end of the spring 66, while the right-hand end of the spring 65 is forced to the left by pressure acting against the head 45. Sleeve 68 is subject to equal and opposite forces by the other ends of the springs 65 and 66.

The brakes are operated by depressing the brake pedal 12 to move the plunger 18 (FIGURE 2) to the left. This operates the valve mechanism, as described below, and takes place within the limits of the space 40. The push rod 15 is pivoted as at 14 to the pedal 12. When the valve mechanism is operating, the head 39 merely slides within the sleeve 37 within the limits of the space 40 and thus performs no function.

Movement of the plunger 18 toward the left transmits movement through the stem 80, thus moving the head 78 into engagement with the valve 96. This closes communication between the chamber 87 and the passages 83 and 86, thus cutting off the chambers 79 and 94 from the pressure always present in the chamber 87. Slight further movement of the head 78 moves the valve body 85 to the left to crack the valve 97, thus venting the chamber 94 to the atmosphere as at 99. Since the chamber 79 communicates with the chamber 94 through passages 83 and 86, the chamber 79 also will be vented to the atmosphere. When the chamber 94 is open to the atmosphere, the motor chamber 91, formerly under source pressure, will be exhausted to the atmosphere.

The resistance of the master cylinder plunger to movement prevents the head 46 from moving to the left relative to the head 47, and since the motor chamber 90 is always in communication with the pressure chamber 87, differential pressures will be set up on opposite sides of the motor piston 45 to move this piston to the left to operate the master cylinder plungers and displace fluid into the wheel cylinders.

While the operation described above refers to the venting of the motor chamber 91 to the atmosphere, the pressure drop in such chamber and in the chamber 79 will be determined by the operation of the valve mechanism. For example, if the valve 96 is closed and the valve 97 opened for a moderate brake application, substantial pressure may be retained in the chambers 79 and 91. When the desired degree of brake application has been reached, the operator will ease up very slightly on the brake pedal to allow the valve 97 to close and thus establish a lap position of the valves 96 and 97. Assuming that the source pressure is 150 p.s.i., such pressure will be retained in the chamber 90 whereas pressure in the chamber 91 may drop only to 100 p.s.i., thus causing a differential pressure of 50 p.s.i. to exist between the chambers 90 and 91. If pressure in the chamber 79 is similarly dropped, a 50 p.s.i. differential will exist between chambers 87 and 79.

As soon as any reduction in pressure in the chamber 79 occurs incident to initial valve operation, pressure in the chamber 87 will act on the left-hand face of the head 78 to provide a first stage of pedal reaction. In this early stage, the portion of the diaphragm 77 centrally of the radial width thereof will remain in its normal position opposed by spring 88. When differential pressure in the chambers 79 and 87 increases to a predetermined point, the spring 88 will yield and a higher secondary reaction will be applied to the brake pedal. The elements referred to for creating such reaction form no part per se of the present invention and are now known in the art.

When a brake application has been completed, the pedal will be released so that the valve 97 returns to closed position and the head 78 will be spaced from the valve 96, thus reopening the reaction chamber 79 and motor chamber 91 to the source of pressure. The piston 45 will return to its normal position through the action of the conventional master cylinder spring (not shown).

It will be noted that the cylindrical portion 49 of the body 46 limits movement of the motor piston to the off position shown in FIGURE 2 by engaging the shoulder 35. This engagement is re-established when the brake pedal is released as described above.

Assuming that a failure of pressure in the source occurs, there will be a drop in pressure in the valve chamber 87, and with the valves in normal positions, pressure will drop in the motor chambers 90 and 91. Under such conditions there will be no pressure forces for maintaining the springs 65 and 66 compressed. The body 46 will not move to the left in FIGURE 2 since it will be resisted by the residual pressure in the master cylinder and by the master cylinder plunger return spring. There will be negligible resistance to movement of the body 47 to the left, and accordingly the springs 65 and 66 will expand. The spring 66 will effect movement of the flange 70 to the right and similar movement will be transmitted from the flange 69 to the spring 65. The right-hand end of this spring will then move the body 47 to the right, the cylindrical portion 48 thereof sliding axially in the cylindrical portion 49 of the head 46.

Movement of the body 47 to the right similarly moves the sleeve 37. The abutment 38 will move to take up the play 40, after which the sleeve 37 and push rod 15 will be moved as a unit to raise the pedal 12 to the broken line position shown in FIGURE 1. This movement will continue until the flange 56 of the body 47 engages the head 61 to limit further expansion of the springs 65 and 66, at which time the brake pedal will be in the broken line position shown in FIGURE 1. Under such conditions the pedal can be operated from the high pedal position for the manual operation of the brakes. It will be noted that, as distinguished from my copending application referred to, the parts are not locked to each other for the transmission of positive forces from the rod 15 to the rod 53. The leverage provided by the brake pedal under such conditions is close to that employed in conventional brake systems. The loading of the springs 65 and 66 is such that during manual operation, from approximately 500 to 550 p.s.i. master cylinder pressures can be developed by the transmission of forces through the springs before the springs will start to compress. Such force will be delivered from the rod 15 through the abutment 38 to the sleeve 37, from the flange 57 of this sleeve to the body 47, through the spring 65 to the flange 69, through the flange 70 to the spring 66, and thus through the body 46 to the push rod 53.

If, after movement of the pedal 12 to its high position, pressure should be restored in the source, the normal position of the valving will allow a supply of pressure to the chambers 90 and 91 to re-compress the springs and return the parts to normal positions. In the normal position of the brake pedal the head 17 engages the plunger 18. In the high pedal position, the head 17 is substantially spaced from the plunger 18 for the free movement of the brake pedal in manual operation without effecting the valve plunger 18 or any parts connected thereto.

It will be apparent that the present construction not only eliminates any mechanical locking of the elements for manual pedal operation, but also permits the use of a pressure suspended motor. This fact permits a very rapid response of the motor to operation of the valving since it takes less time to exhaust pressure from the chamber 91 than it would take to supply pressure to the chamber 90 if the motor were air suspended. When pressure drops in the chamber 90 incident to a failure in the source, the body 47 moves immediately to the right, relieving spring pressure acting to the left against the push rod 53 and this rod will remain stationary for the reasons stated. Pressure could not be maintained in the chamber 90 however under normal conditions, without pressure in the chamber 91 since this would provide the differential pressure by which the motor piston is operated. Source pressures in the chambers 90 and 91 under normal conditions balance each other, as will be apparent, until the motor mechanism is to be operated in the manner described.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A fluid pressure motor mechanism comprising a pressure responsive unit having chambers at opposite sides thereof, a member to be operated connected to said pressure responsive unit, a valve mechanism operable for controlling pressures in said chambers to move said pressure response unit by establishing differential pressures in said chambers, a pedal having a first normal position engaging said valve mechanism and from which position it is movable to operate said valve mechanism, and normally inoperative pedal control means connected to said pedal and operative for moving said pedal to a second normal position, said pressure responsive unit comprising relatively axially movable members and spring means between such members tending to push them apart and operate said pedal control means, one of said chambers normally being subject to pressure in the source to maintain said spring means compressed and inoperative so that upon a failure in such pressure, said spring means will expand and move said pedal to said second position whereby said pedal will transmit forces through said pedal control means and through said spring means to operate said member to be operated.

2. A fluid pressure motor mechanism comprising a pressure responsive unit having chambers at opposite sides thereof, a member to be operated connected to said pressure responsive unit, a valve mechanism normally connecting both of said chambers to a source of pressure and operable to relieve pressure from one chamber whereby pressure in the other chamber will move said pressure responsive unit, a pedal having a first normal position engaging said valve mechanism and from which position it is movable to operate said valve mechanism, and normally inoperative pedal control means operative for moving said pedal to a second normal position, said pressure responsive unit comprising relatively axially movable members and spring means therebetween tending to push said members apart and operate said pedal control means, normal pressure in both of said chambers maintaining said spring means compressed so that upon a failure in such pressure, said spring means will expand and engage said pedal control means to move said pedal to said second position, spaced from said valve mechanism, and from which latter position said pedal is movable to transmit forces through said pedal control means and said spring means to operate said member to be operated.

3. A motor mechanism according to claim 2 wherein said axially movable members are telescoped one within the other, said spring means comprising coaxial springs, one end of one spring engaging one end of one axially movable member and the opposite end of the other spring engaging the other axially movable member, and spring seat means between said springs engaging the other ends thereof so that each spring transmits force through said spring seat member to the other spring.

4. A fluid pressure motor mechanism comprising a cylinder, a pressure responsive unit therein having chambers at opposite sides thereof, said pressure responsive unit comprising relatively axially movable members one of which has means extending through one of said chambers to engage a member to be operated, the other of said chambers having fixed communication with a source of pressure, a valve mechanism normally connecting said one chamber to said source and operative for venting said one chamber to the atmosphere whereby pressure in said other chamber will operate said pressure responsive unit to move said member to be operated, a pedal having a first normal position engaging said valve mechanism and from which position it is movable to operate said valve mechanism, spring means arranged between said axially movable member and normally maintained compressed by normal pressures in said chambers, a failure in pressure in said source releasing said spring means to move said axially movable members relatively apart, and means operative upon the expansion of said spring means for establishing mechanical connection between the axially movable member adjacent said other chamber and said pedal and for moving said pedal to a second normal position spaced from said valve mechanism whereby said pedal is operable for transmitting forces through said axially movable members and the spring means therebetween for moving said member to be operated.

5. A motor mechanism according to claim 4 wherein said means moving said pedal to said second position comprises a push rod connected to said pedal and having lost motion connection with said last mentioned axially movable member, which lost motion connection is taken up when said spring means expands.

6. A motor mechanism according to claim 4 wherein said cylinder is provided with heads one of which closes the end of said other chamber and is provided with a bearing, said means for moving said pedal to said second position comprising a sleeve slidable in said bearing and connected to said last mentioned axially movable member, and a push rod pivotally connected to said pedal and having lost motion connection with said sleeve within the limits of which lost motion said pedal will normally operate said valve mechanism without engaging said push rod with said sleeve, but wherein, upon expansion of said spring means said lost motion is taken up to move said push rod and move said pedal to said second position.

7. A motor mechanism according to claim 4 wherein said axially movable members are provided with coaxial telescoping cylindrical walls the inner of which is in sealed sliding engagement with the outer wall and the latter of which is in sealed sliding engagement with said cylinder.

8. A fluid pressure motor mechanism comprising a cylinder, a pressure responsive unit therein having chambers at opposite sides thereof, said pressure responsive unit comprising a pair of members having end walls exposed to the respective chambers, one such wall being connected through one of said chambers to a member to be operated, each of said members further comprising telescoping cylindrical walls the inner of which is in sliding sealed engagement with the other cylindrical wall when the latter of which is in sliding sealed engagement with said cylinder and has a portion engaging a portion of said cylinder to limit its movement toward the other chamber, spring means between said end walls expandable to separate said walls, said other chamber having fixed communication with a source of pressure, a valve mechanism normally connecting said one chamber to said source and being operable for venting pressure in said one chamber whereby pressure in said other chamber will move said pressure responsive unit to move the member to be operated, normal pressures in said chambers maintaining said spring means compressed, a pedal having a first normal position engaging said valve mechanism and from which position it is movable to operate said valve mechanism, and means operative upon an expansion of said spring means incident to a failure in pressure in said source for establishing mechanical connection between the wall adjacent said other chamber and said pedal and for moving said pedal to a second normal position spaced from said valve mechanism whereby, upon operation of said pedal, the latter will transmit force to said last mentioned wall and through said spring means to the wall adjacent said one chamber to transmit force to the member to be operated.

9. A motor mechanism according to claim 8 wherein said spring means comprises a pair of concentric springs, one end of one spring engaging one end wall and the opposite end of the other spring engaging the other end wall, and spring seat means concentric with and between said springs and having opposite ends engaging the other ends of said springs.

10. A motor mechanism according to claim 8 wherein said means for moving said pedal to said second position comprises a push rod pivotally connected to said pedal and having lost motion connection with the adjacent axially movable member and within the limits of which lost motion said pedal is movable from said first normal position to operate said valve mechanism, expansion of said springs taking up said lost motion and moving said pedal to said second normal position.

11. A motor mechanism according to claim 8 provided with means carried by one of said axially movable members for limiting movement of the other such member therefrom upon expansion of said spring means.

12. A motor mechanism according to claim 8 provided with means carried by one of said axially movable members for limiting movement of the other such member therefrom upon expansion of said spring means, said means for moving said pedal to said second normal position comprising a sleeve fixed to said last mentioned end wall, and a push rod pivoted at one end to said pedal and having its other end slidable in said sleeve and having lost motion connection therewith.

References Cited in the file of this patent

UNITED STATES PATENTS

| | | |
|---|---|---|
| 2,706,020 | Freers et al. | Apr. 12, 1955 |
| 2,755,891 | Levell et al. | July 24, 1956 |
| 2,844,228 | Schnell | July 22, 1958 |
| 2,910,147 | Fishtahler et al. | Oct. 27, 1959 |
| 3,063,427 | Hill | Nov. 13, 1962 |
| 3,067,767 | Ayers et al. | Dec. 11, 1962 |